United States Patent [19]
Chiuminatta et al.

[11] Patent Number: 5,660,161
[45] Date of Patent: Aug. 26, 1997

[54] MOUNTING ARBOR FOR SAW CUTTING BLADES

[76] Inventors: Edward R. Chiuminatta, 16405 Everett; Alan R. Chiuminatta, 16862 Mariposa Ave., both of Riverside, Calif. 92504

[21] Appl. No.: 340,614

[22] Filed: Nov. 16, 1994

Related U.S. Application Data

[62] Division of Ser. No. 186,030, Jan. 25, 1994, Pat. No. 5,373,834, which is a continuation of Ser. No. 863,708, Apr. 3, 1992, Pat. No. 5,303,688.

[51] Int. Cl.$^6$ .................................................. B28D 1/12
[52] U.S. Cl. .................................................. 125/15; 76/112
[58] Field of Search .................................................. 125/15, 13.01; 451/342, 542, 541, 911; 83/676; 76/112; 51/293

[56] References Cited

U.S. PATENT DOCUMENTS

| | | | |
|---|---|---|---|
| 367,211 | 7/1887 | Kimball | 451/342 |
| 1,077,572 | 11/1913 | Welch | 451/911 |
| 1,130,914 | 3/1915 | Maker | 451/342 |
| 1,947,662 | 2/1934 | Robinson | 83/676 |
| 2,572,042 | 10/1951 | Martin | 451/342 |
| 2,649,868 | 8/1953 | Gommel | 451/342 |
| 2,822,648 | 2/1958 | Metzger et al. | 451/342 |
| 2,831,514 | 4/1958 | Avard | 30/388 |
| 2,912,021 | 11/1959 | Gommel | 83/676 |
| 2,997,819 | 8/1961 | Schacht | 451/510 |
| 3,869,795 | 3/1975 | Treace | 30/388 |
| 4,267,814 | 5/1981 | Benson et al. | 125/15 |
| 4,454,901 | 6/1984 | Thorsness | 144/218 |
| 4,456,303 | 6/1984 | Due | 299/10 |
| 4,928,662 | 5/1990 | Chiuminatta et al. | 125/13.01 |

FOREIGN PATENT DOCUMENTS

| | | |
|---|---|---|
| 0028285 | 5/1981 | European Pat. Off. . |
| 1878647 | 8/1963 | Germany . |

*Primary Examiner*—Robert A. Rose
*Attorney, Agent, or Firm*—Knobbe, Martens, Olson & Bear, LLP

[57] ABSTRACT

A mounting for use in mounting rotating cutting blades to the drive shaft of saws is provided. The mounting is an arbor or arbor sleeve having a non-symmetrical outer mounting surface onto which is mounted a cutting blade which contains a similarly configured mounting hole. The arbor or arbor sleeve is designed for use with a cutting blade having a mounting hole which, when viewed from one side of the blade is the same as the outer surface mounting surface, and which viewed from the other side of the blade is not the same. The use of the arbor or arbor sleeve of the present invention with a cutting blade having these characteristics results in the blade being mounted on the saw in only one orientation.

39 Claims, 6 Drawing Sheets

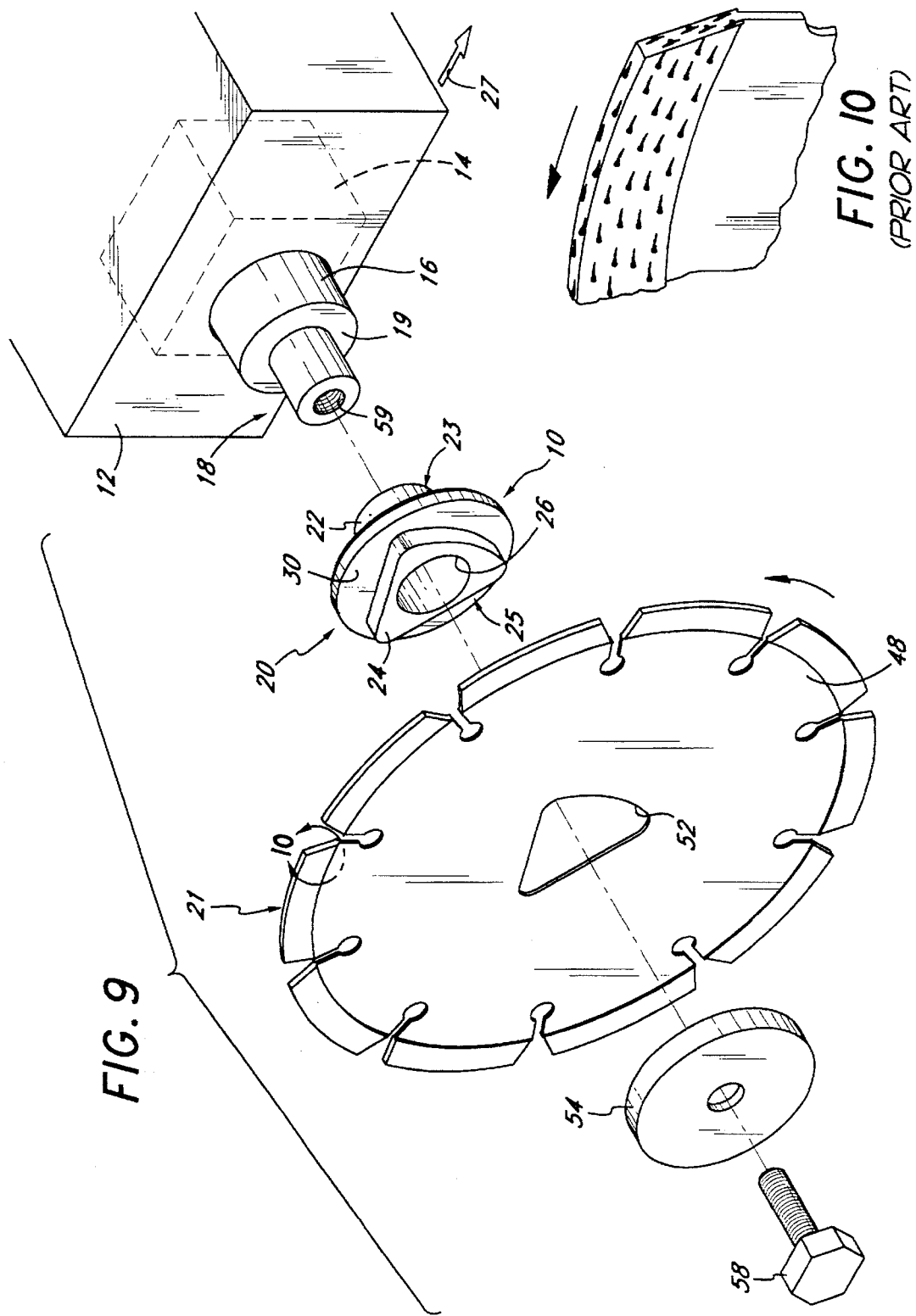

MOUNTING ARBOR FOR SAW CUTTING BLADES

This application is a divisional of application Ser. No. 08/186,030, filed Jan. 25, 1994, which was a continuation of Ser. No. 07/863,708 filed Apr. 3, 1992 and issued Apr. 19, 1994 as U.S. Pat. No. 5,303,688.

FIELD OF THE INVENTION

The present invention relates to a mounting device for rotating saw cutting blades. More specifically, the invention relates to a specially configured arbor and correspondingly configured aperture in a circular concrete saw blade to prevent the cutting blade from being mismounted on the saw.

BACKGROUND OF THE INVENTION

Circular saw blades are normally driven by rotating shafts connected to motors. In many applications, the rotating cutting blades have circular holes through the center for acceptance of a circular drive shaft. The shafts often have a smaller diameter mounting portion which extends from a larger primary portion of the drive shaft to form a shoulder. The blades are typically pressed over the smaller diameter mounting portion until they are stopped against the shoulder formed by the main drive portion of the shaft. The blade is then locked onto the shaft by clamping it between the shoulder on the main portion of the drive shaft and either a threaded locking nut which is threaded onto the end of the small diameter mounting portion or a bolt threaded into a threaded hole in the end of the shaft. The friction from the clamping force prevents the blade from rotating with the shaft.

Often times, material is allowed to enter the hole in which the clamping bolt is threaded. This prevents the bolt from being tightened sufficiently into the threaded hole in the shaft. When this occurs, there is an insufficient clamping force to hold the rotating cutting blade against the shoulder, and because the mounting is circular, the blade may slip. When the blade slips with respect to the shaft, the blade speed often decreases rapidly, causing spalling or chipping of the concrete surface adjacent groove being cut.

In order to remedy this problem, non-circular arbor sleeves, or cutting blade mounting members, can be attached to the drive shafts. The arbor sleeves are normally securely mounted to the drive shaft, so they do not rotate. For example they can be clamped, welded, pinned to the shaft, keyed, or held by set screws. A surface of the arbor sleeve is used as the surface upon which the rotating cutting blade is then mounted. The cutting blade is configured to have a mounting hole of the same size and shape of the arbor to allow it to be positioned over the arbor to be driven by the motor drive shaft.

Arbor sleeves are normally square or a circular shaft with symmetric flutes, although they may have other symmetric configurations. The shape of the arbor sleeve is symmetrical on its outer surface, in order that the cutting blade may be easily mounted on it without much alignment effort. When a non-circular arbor sleeve is employed, the cutting blade may not slip, as the hole of the blade and the outside of the arbor sleeve have sides which contact one another.

Alternatively, the drive shaft can be configured to have a symmetric non-circular end, and the cutting blade configured to have a correspondingly shaped hole through which the arbor can be inserted. While it is possible to have the blade mounting area of the drive shaft, or arbor, itself be machined into the desired shape, sleeves are more easily machined at lower cost.

Because the arbors or arbor sleeves are symmetrical in shape, the cutting blade may be mounted so that either side of the cutting blade faces the saw. Normally, the person installing the saw will orientate the cutting blade so the teeth on the blade are in the correct orientation relative to the direction the saw is to travel during cutting. For wood cutting saw, the saw teeth orientation is apparent, and the blade can be easily orientated to rotate in the correct direction relative to the direction that the saw will travel during cutting.

With concrete cutting saws, however, the teeth do not have a readily apparent directional orientation. Concrete cutting saw blades are made with diamond impregnated cutting segments that are symmetrically shaped. When used to cut hardened concrete and when water lubricated, the blades can be used in either orientation, or with either side of the blade toward the saw when the saw is traveling in the same direction. Thus the orientation of the water lubricated blade on the saw does not matter for cured, hardened concrete.

When the same blade is used to cut wet or very green concrete without water lubrication, however, the blade orientation is important. The cutting segments are formed by having harder cutting media, such as diamond chips or tungsten carbide particles, being placed in a softer support or binding matrix, such as bronze or other softer metals. The cutting segments are either formed on the metal support disk, or formed separately and then bonded to the support disk. After the cutting segments are on the disk, the cutting segments are dressed by slightly abrading the cutting segments to remove enough of the binding matrix to expose the cutting particles. This dressing typically leaves one side of the cutting particles exposed while the opposite side has a trail of the softer binding matrix extending from the cutting particle (FIG. 10). If the cutting blade is rotated so that the exposed side of the particles face the direction of the blade rotation, the blade cuts well. If, however, the blade is orientated the other way so that the exposed portion of the cutting particles face away from the direction of the blade rotation, then the cutting blade will not cut well because only the binding material and not the cutting particles contact the concrete. This will also occur if the blade is not dressed sufficiently and the cutting particles are not exposed adequately before cutting. When the blade is mismounted or is insufficiently dressed, chattering of the blade and spalling and/or chipping of the concrete occurs when the blade is used to cut the concrete. Further, because the blade is not water lubricated when cutting wet or very green concrete, the friction created between the concrete and the binding material causes extreme heat build-up, causing the blade to warp, which in turn damages the surface of the concrete surrounding the cutting blade. In some cases, the heat build-up combined with the chattering of the warped blade will cause the cutting segments to detach from the blade. This situation is dangerous, as the cutting segments may be propelled into the user and cause injury, or be propelled into and damage the saw.

Previously, cutting blades used to cut wet concrete were labeled with notices such as "this side out," to insure correct orientation of the blade on the saw. That labeling, however, is not always effective. There is thus needed a way to insure correct orientation of a circular concrete cutting saw blade on the saw, and a way to guard against rotation of the saw blade relative to the drive shaft.

SUMMARY OF THE INVENTION

In accordance with one aspect of the present invention, there is provided a specially shaped mounting for use with rotating cutting blades and cutting saws having drive shafts, which is especially suitable for concrete cutting saws and blades. The mounting is preferably on located an arbor sleeve, although it may be located on an arbor itself. The sleeve is configured so that its shape cooperates with a hole in the cutting blade to allow the blade to be mounted on the sleeve in only one orientation. The arbor sleeve of the present invention is located on a drive shaft of a saw and used to rotated the cutting blade. The drive shaft of the saw has a shoulder, and a threaded portion, all along a longitudinal axis.

The arbor sleeve has a proximal and distal end, the proximal end being located nearer the saw. The arbor sleeve has a shaft mounting member with a longitudinal hole therein sized to accommodate the insertion of at least a portion of the drive shaft. A flange extends radially outward from the shaft mounting member. The flange prevents the cutting blade from sliding along the shaft.

A blade mounting member or mounting surface is also provided on the arbor sleeve. The blade mounting member is the mounting surface on which the cutting blade is mounted. The blade mounting member is located distal of the flange on the sleeve. The blade mounting member has a primarily triangular exterior or outer surface and a circular bore in its middle for acceptance of a motor drive shaft. Two of the triangular sides of the blade mounting member are substantially straight, these two sides being advantageously connected at their intersection by a generally rounded or arcuate corner. The third side of the triangular blade mounting member is convex in shape, and connects with the first and second sides at generally rounded or arcuate corners. The three sides of the triangle are of unequal length.

The blade mounting member thus has a non-symmetrical shape about an axis orthogonal to the longitudinal axis through the center of the hole, and about which the mounting member rotates during cutting.

The arbor sleeve of the present invention is designed to be used with a rotating cutting blade having a plurality of concrete cutting segments located about the periphery of the disc. The blade has a first side and a second side, and a mounting hole therein for mounting the blade to the drive shaft for rotation of the blade about a longitudinal axis through the hole.

The hole in the blade, when viewed from the first side, is the same as the shape of the blade mounting member. The hole is non-symmetric in shape, however, such that when viewed from one direction along the longitudinal axis can not be rotated about the longitudinal axis so as to coincide with the shape of the hole when viewed from the other direction along the longitudinal axis. Thus, the blade will fit onto the arbor sleeve in only one orientation.

One specific configuration oft he blade mounting member has a center point with a horizontal and vertical axis therethrough. For orientation purposes, it is to be understood that "in front of" the vertical axis means to the right of the vertical axis or in the positive horizontal direction, and "behind" the vertical axis means the opposite thereof; "above the horizontal" means on top of the horizontal axis or in the positive vertical diretion, and "below" the horizontal means the opposite thereof. A first corner of the triangle is located at a radius R1 which emanates from a point located a distance D1 away from the center point in front of the vertical and along the horizontal axis. A second corner is located at a radius R2 such that R2 approximately equals 1.2 R1, and emanates from a point located behind the vertical axis a distance D2 away from the center point and at an angle θ of about 54 degrees above the horizontal axis. The distance D2 approximately equals 0.93 D1. A third corner of the triangle has a radius R3 such that R3 approximately equals 1.06 R1, and emanates from a point located behind the vertical axis a distance D3 away from the center point and at an angle α of about 66 degrees below the horizontal axis. The distance D3 approximately equals 0.89 D1. A first side of the triangle tangentially connects the outside of the first and second corners, and a second side tangentially connects the outside of said second and third corners. A third side, having a radius R4 emanating from a pointed located in front of the vertical axis a distance D4 away from the center point and at an angle β of about 9 degrees above the horizontal axis. D4 approximately equals 1.32 D1, where said third side tangentially connects the outside of said first and third corners.

In accordance with another aspect of the present invention, there is provided a method of orienting the rotating concrete cutting blade on the drive shaft in the correct orientation. The method comprises providing a blade mounting member which is non-symmetrical when rotated 180 degrees about an axis orthogonal to the longitudinal axis of the drive shaft about which the blade rotates during cutting. A hole is provided in the blade, where the hole when viewed from the first side of the blade is the same as the shape of the blade mounting member, but not when viewed from the opposite side of the blade. The blade is then placed on the blade mounting member so that the hole in the blade coincides with and fits over the blade mounting member, and the blade is secured to the shaft. Advantageously, the blade is secured by placing a washer on the shaft distal of the blade, and then placing a nut on the threaded portion of the shaft whereby the nut provides a clamping force to clamp the blade between the washer and the flange of the sleeve.

This method and apparatus prevents the user from attaching the rotating cutting blade to the arbor sleeve in an incorrect orientation. Thus, cutting blades used to cut wet or green concrete may not be mismounted so as to cut in the wrong direction and cause chipping and spalling, and will not overheat and warp, further causing damage to the concrete. The arbor sleeve of the present invention will also help prevent the use of a cutting blade which is not designed for use with a concrete saw which is fitted with this arbor. In this manner, users will be prevented from accidentally using a cutting blade which was not intended for use with the particular concrete saw.

Further objects, features, and advantages of the present invention will become apparent from the detailed description of the drawings which follows, when considered with the attached figures.

BRIEF DESCRIPTION OF THE DRAWINGS

FIG. 9 is a perspective view of an arbor sleeve, drive shaft, motor, cutting blade, washer, and mounting bolt in accordance with an alternate embodiment of the present invention.

FIG. 10 is a partial perspective view of a cutting blade as known in the prior art.

DETAILED DESCRIPTION OF THE ILLUSTRATED EMBODIMENTS

Figure 1:
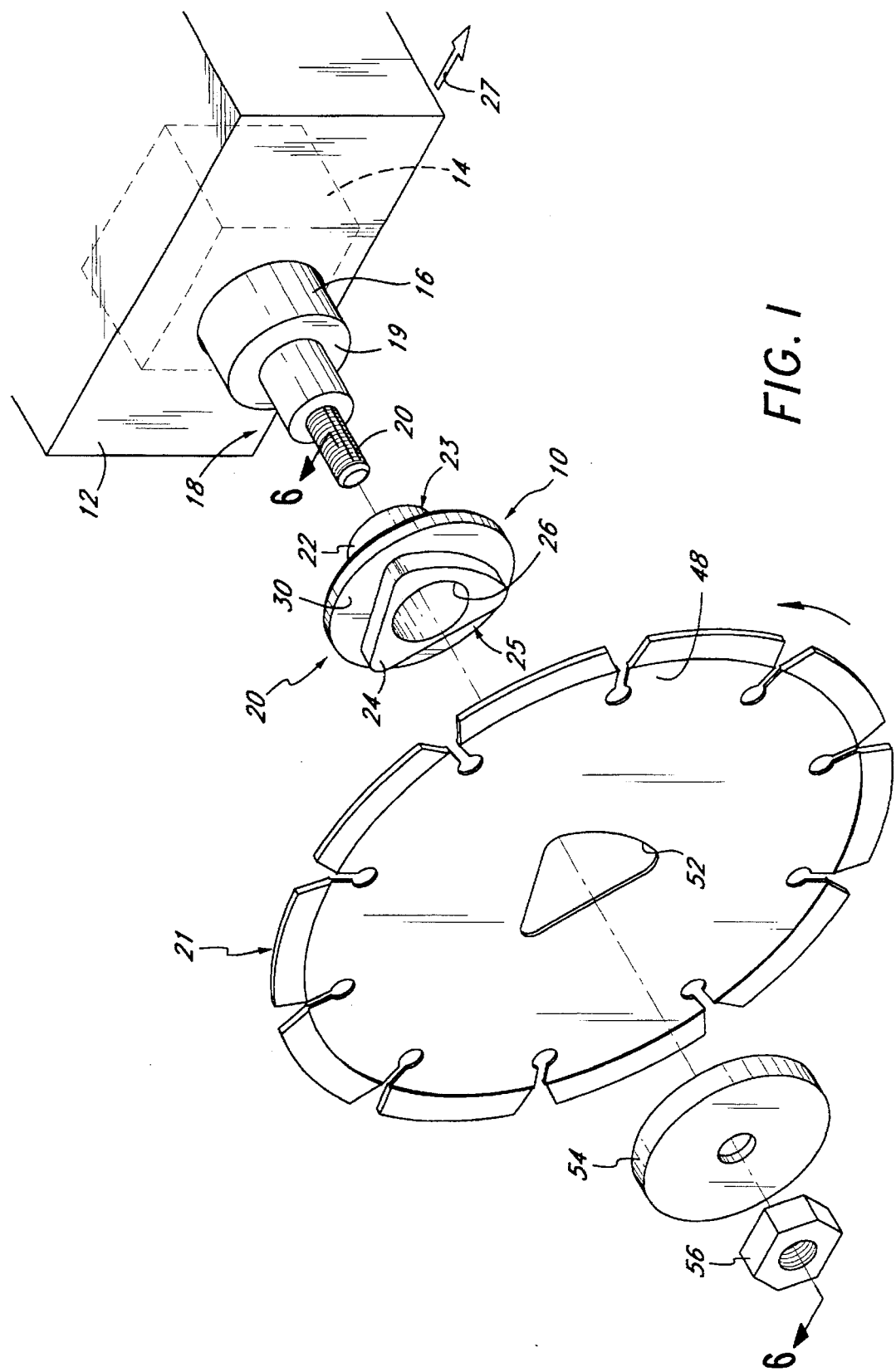
FIG. 1 is a perspective view of an arbor sleeve, washer, nut, drive shaft and motor, and a cutting blade with a mounting hole therein in accordance with the present invention.
Figure 2:
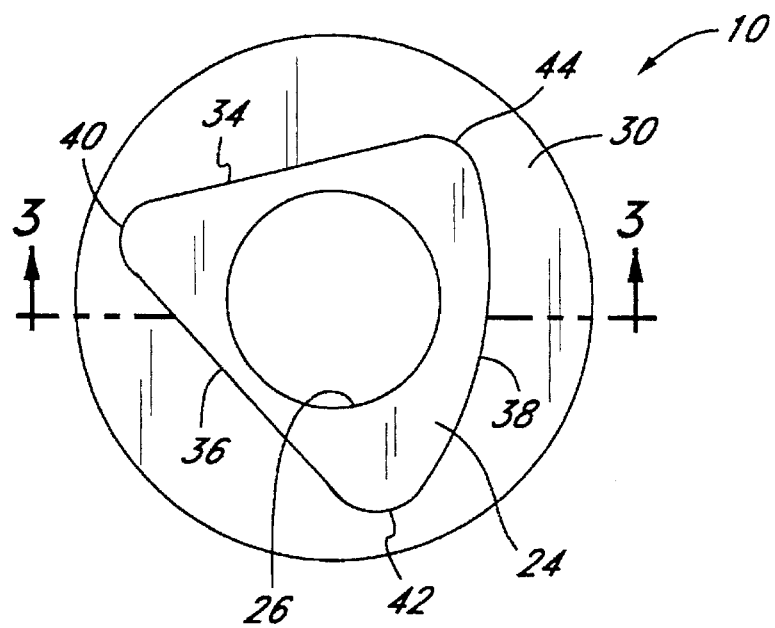
FIG. 2 is a front view of the arbor sleeve of FIG. 1.
Figure 3:
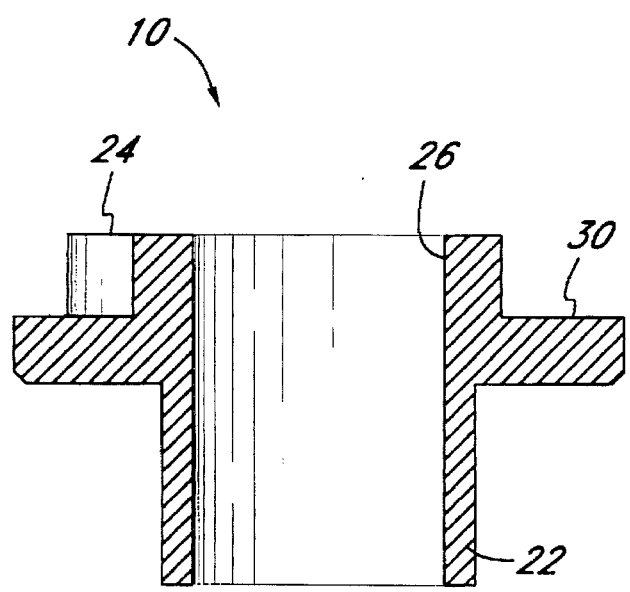
FIG. 3 is a sectional side view of the arbor sleeve of FIG. 1.

Referring to FIGS. 1–3 and 6–7, there is shown the mounting of the present invention in the form of an arbor sleeve 10. The arbor sleeve 10 is for use with a saw, such as a concrete saw 12 having a motor 14. A drive shaft 16 is rotated by the motor 14 about the longitudinal axis of the shaft 16. The drive shaft 16 has a free end 18 for acceptance of a cutting blade 21. The free end 18 of the drive shaft 16 extends to a shoulder 19 with a smaller threaded shaft 20 extending longitudinally from the shoulder 19 away from the saw 12. In the context of a concrete cutting saw, such as that described in U.S. Pat. No. 5,056,499, the drive shaft 16 is turned such that the blade 21 will cut in an up-cut direction, as shown relative to the direction of travel 27 of the saw 12. In general, the arbor sleeve 10 has a proximal end 23 and a distal end 25 relative to the saw 12, with the proximal end 23 being closer to the saw 12 and the distal end 25 being further away. The arbor sleeve 10 also has a shaft mounting portion 22, a blade mounting member 24, and a central bore 26 therethrough.

The shaft mounting portion 22 is generally cylindrical in shape, and is located at the proximal end 23 of the arbor sleeve 10. The shaft mounting portion 22 has an outer diameter of about 0.81 inches (20.6 mm) and a length of about 39 inches (9.9 mm). The length is primarily a function of the desired contact area between the drive shaft 16 and the arbor sleeve 10. The outer diameter is only slightly larger than the diameter of the shaft 16 upon which the arbor sleeve 10 is mounted. The shaft mounting portion 22 is the part of the arbor sleeve 10 which is used to connect the sleeve to the free end 18 of the drive shaft 16. The shaft mounting portion 22, as illustrated, is secured to the free end 18 of the drive shaft 16. The mounting portion 22 may be welded, or attached by screws, pins, friction or other means known to those skilled in the art so as to prevent rotation of arbor sleeve 10 relative to shaft 16. When the arbor sleeve 10 is mounted onto the drive shaft 16, the shoulder 19 advantageously abuts with the distal end 23 of the sleeve.

A blade support flange 30 extends radially outward from between the shaft mounting member 24 and the blade mounting member 26. The blade support flange 30 is also cylindrical in shape, but has a larger diameter than the mounting portion 22. The flange 30, as illustrated, has an outer diameter of about 1.5 inches (38.1 mm). The flange 30 has a thickness of about 0.22 inches (5.6 mm). The flange 30 is sized to prevent the cutting blade 21 from sliding past the blade mounting member 24 and along the drive shaft 16. The central bore 26 passes through the center of the flange 30 as well.

The blade mounting member 24 contains a specially shaped mounting surface of the arbor sleeve 10. The blade mounting member 24, as illustrated, is generally triangular in shape, with three sides of unequally length and rounded corners. Advantageously, two of the sides are substantially straight while the third side is convex. The blade mounting member 24 thus has three sides 34, 36, 38, joined at three corners 40, 42, 44, and with the central bore 26 running therethrough. The mounting member 24 may be defined from a center point 28 located at the center of the bore 26 and an arbitrary horizontal axis H and vertical axis V running through this center point. For orientation purposes, it is to be understood that "in front of" the vertical axis V means to the right of the vertical axis V or in the positive horizontal direction, and "behind" the vertical axis V means the opposite thereof; "above the horizontal" means on top of the horizontal axis H or in the positive vertical direction, and "below" the horizontal axis H means the opposite thereof. The longitudinal axis of rotation passes through the center point 28.

Figure 7:
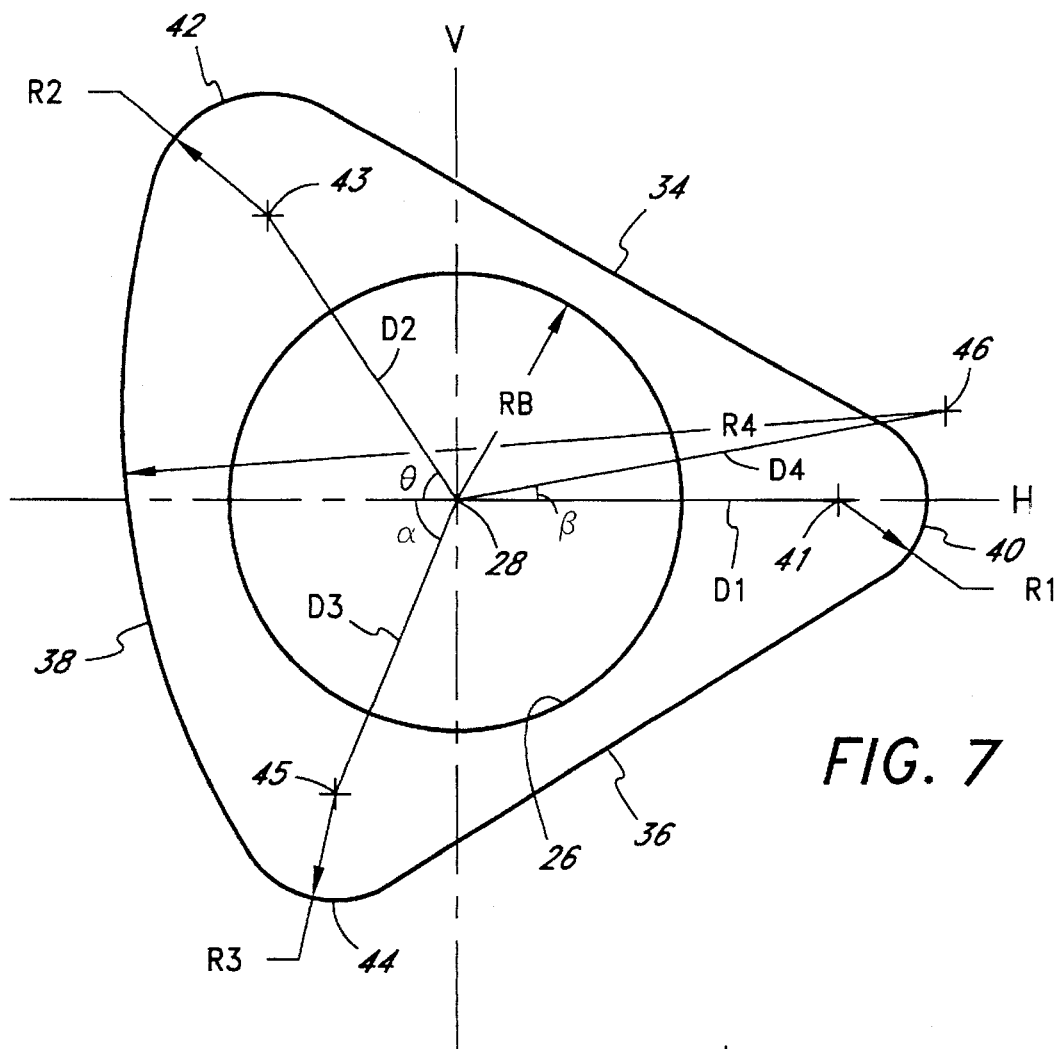
FIG. 7 is a dimensional front view of a blade mounting member.

Referring to FIG. 7, the first corner 40 is, as illustrated, rounded, having a radius R1 of about 0.135 inches (3.4 mm), the radius extending from a first point 41 located in front of the vertical along the horizontal axis H (or at an angle of 0 degrees along the horizontal axis H) a distance D1 of about 0.487 inches (12.4 mm) from the center point 28. The second corner 42 is also rounded, having a radius R2 of about 0.163 inches (4.1 mm). The radius of the second corner 42 extends from a second point 43 located behind the vertical axis V, being a distance D2 of about 0.447 inches (11.4 mm) from the center point 28 and at an angle θ of about 54 degrees above horizontal axis H. The third corner 44 is also rounded, having a radius R3 of about 0.143 inches (3.6 mm). The radius of the third corner 44 extends from a third point 45 located behind the vertical axis V, being about 0.432 inches (11.0 mm) from the center point 28 and at an angle α of about 66 degrees below the horizontal axis H.

The first side 34 is substantially straight, and as illustrated, connects the first corner 40 and second corner 42 in a tangent fashion, thus having a length of about 0.830 inches (21.1 mm). The second side 36 is also generally straight, connecting the first corner 42 and third corner 44 in a tangential fashion, thus having a length of about 0.771 inches (1.96 mm).

The third side 38 is arcuate in shape, having a radius R4 of about 1.095 inches.(27.8 mm). The radius of the third side 38 extends from a fourth point 46 located in front of the vertical axis V, being a distance D4 of about 0.644 inches (16.4 mm) from the center point 28 and at an angle β of about 9 degrees above the horizontal axis H. The third side 38 intersects the second corner 42 and third corner 44 in a tangential fashion.

The central bore 26 has a radius of about 0.313 inches (7.9 mm), radiating about the center point 28. The shaft bore 26 may, of course, be a different diameter, depending on the diameter of the drive shaft 16 on which it is to be mounted.

As defined from the center point 28 the dimensions of the blade mounting member 24 may be assigned as follows. The first corner 40 radius (R1), second corner 42 radius (R2) and third corner 44 radius (R3) have a relation such that R2 approximately equals 1.2 R1 and R3 approximately equals 1.06 R1 The distance from the center point 28 to the first point 41 (D1), second point 42 (D2) and third point 43 (D3) is such that D2 approximately equals 0.93 D1 and D3 approximately equals 0.89 D1 when the lines from the center point 28 to each point 41, 43, 45 are along about the same angle as defined above.

The first side 36 and second side 34 are of such a length as to intersect the outside of corners 40, 42, 44 in a tangential fashion. The third side 38 is of such a radius as to intersect the outside of the second corner 42 and third corner 44 in a tangential fashion, when the fourth point 46 is along the angle defined above and a distance D4 of about 1.32 D1. The central bore 26 has a radius RB equal to about 2.32 times R1.

While blade mounting member 24 is generally triangular in shape, it is not symmetric. Scalene triangular shapes, where each side is a different length, are believed advantageous.

Figure 4:
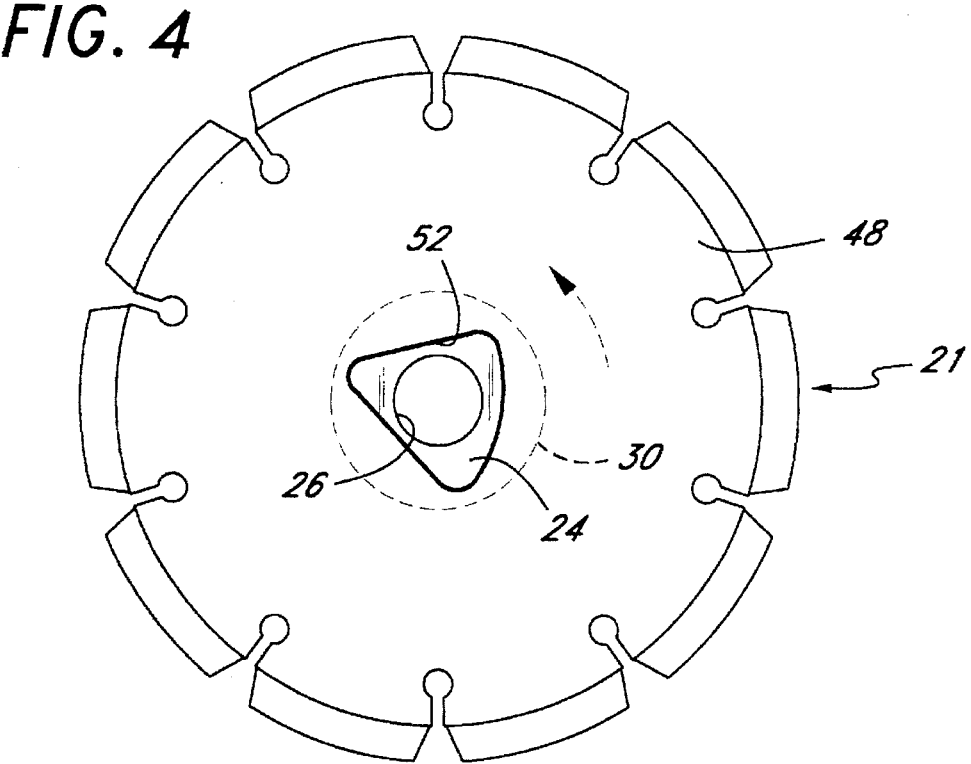
FIG. 4 is a front view of the cutting blade of FIG. 1 mounted on the arbor sleeve of FIG. 1.
Figure 5:
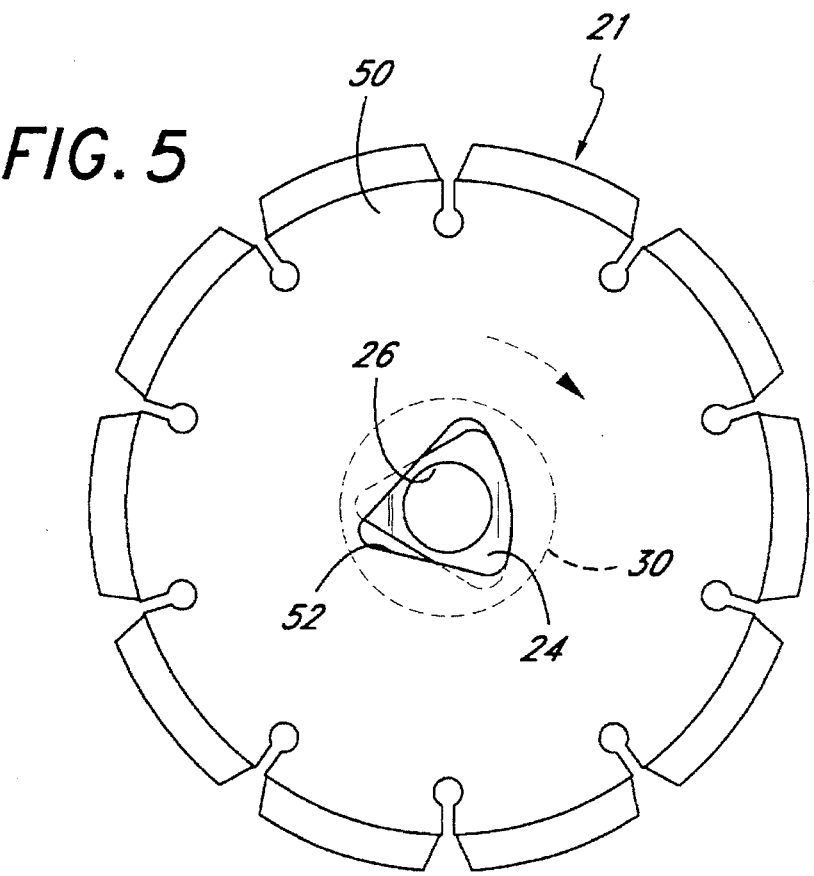
FIG. 5 is a rear view of the cutting blade of FIG. 1 laid over the arbor sleeve of FIG. 1.

Referring to FIGS. 1, 4 & 5, the cutting blade 21 has a first distal side 48, second proximal side 50, and a mounting hole 52 therein. The mounting hole 52 is shaped so that when the cutting blade 21 is viewed from its distal side 48, the hole 52 has the same shape as the blade mounting member 24 and is only larger in size to the extent necessary to allow the blade to be positioned on the mounting member 24. A tolerance of about 0.002 to 0.003 inches (0.05 to 0.08 mm) between the size of the hole 52 and mounting member 24 works well. In this manner, the cutting blade 21 may be mounted on the blade mounting member 24 of arbor sleeve 10 as illustrated in FIG. 4.

Figure 6:
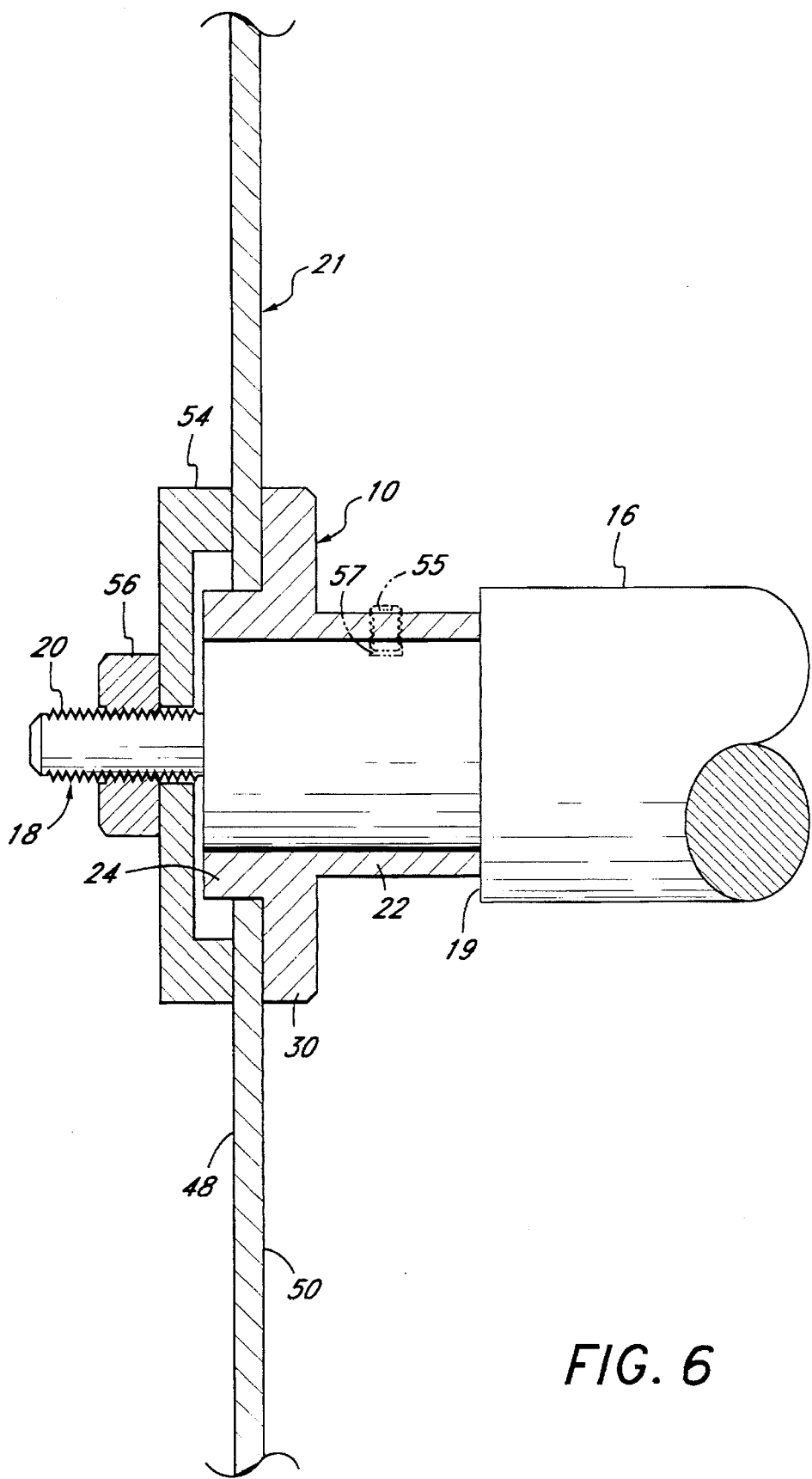
FIG. 6 is a sectional view of the shaft, arbor sleeve, washer and nut along line 6—6 of FIG. 1.

Referring to FIGS. 1 and 6, once placed on the arbor sleeve 10, the blade 21 is secured by placing a washer 54 distally of the blade on the threaded end 20 of the drive shaft 16. The washer 54 is, as illustrated in FIG. 6, a metal disk having a hollow center section which faces the blade and a center hole to allow the passage of the smaller diameter threaded shaft 20 therethrough. A nut 55 is then positioned on the threaded smaller shaft 20 of the drive shaft 16 and tightened so as to press the blade 21 between the peripheral portion of washer 54 and the flange 30 of the arbor sleeve 10. As shown in FIG. 6, friction from the clamping force exerted by nut 56 prevents rotation of the sleeve 10 and blade 21. Alternatively, the sleeve 10 can be secured to shaft 16 as previously described. For illustration, a set screw 55 is shown in phantom in FIG. 6 being inserted into hole 57 in shaft 16. The nut 56 and washer 54 could also be combined into one part rather than two separate pieces.

As illustrated in FIG. 9, the blade 21 may alternatively be secured by a threaded bolt 58 engaging a threaded hole 59. In this embodiment, the drive shaft 16 does not have a threaded portion 20, and instead has the threaded hole 59 in its end along its longitudinal axis. The blade 21 is pressed between the flange 30 of the sleeve 10 and the washer 54 by the bolt 58 which is tightened into the hole 59 in the shaft 16. Once again, the washer 54 and the bolt 58 could be formed as one piece an operate in the same manner.

The mounting hole 52, as illustrated, corresponds in shape to the blade mounting member 24 and will not be repeated in detail. The hole 52 is created by punching from the cutting blade 21 the mounting member 24 shape. The hole 52 could also be created by machining. It is to be understood that the dimensions detailed above for the sleeve 10 and for the hole 52 may be varied moderately and still achieve the same shapes and tolerances.

As can be seen in FIGS. 1, 4 & 5, the blade 21 can only be mounted upon the arbor sleeve 10 in one orientation. As stated previously, the cutting blade 21 is manufactured so that it will only cut properly if rotating in one specific direction. As illustrated, the cutting blade 21 is machined such that when the first side 48 faces away from the saw 12, the blade will cut in the correct up-cut direction. As shown in FIG. 5, if a user attempts to position the cutting blade 21 on the arbor sleeve 10 in a position where the second side 50 of the blade faces away from the saw 12, the blade 21 will not fit on the mounting member 24. This is because when the blade 21 is flipped over, the blade mounting member 24 and the hole 52 in the blade 21 have shapes that no longer coincide. This feature is provided by having the blade mounting member 28 of the arbor sleeve 10 and the mounting hole 52 in the cutting blade 21 be non-symmetrical, so that the mirror image of the hole 52 or member 24 is not the same as the shape of the hole 52 or member 24 viewed directly.

Figure 8:
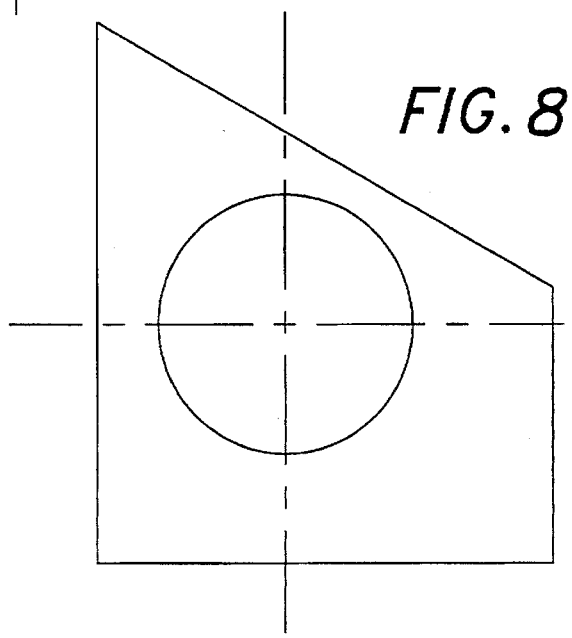
FIG. 8 is a front view of a blade mounting member having a trapezium shape.

It will now be apparent to one skilled in the art given the above disclosure, that in order to accomplish the desired task of preventing the cutting blade 21 from being mismounted, any number of shapes for blade mounting member 24 are possible. The primary requirement in order to prevent mismounting is that the blade mounting member 28 and corresponding mounting hole 52 be of a non-symmetrical shape when viewed from opposite sides along the longitudinal axis, as illustrated by comparing FIGS. 4 & 5 where the blade 21 is rotated 180 degrees about vertical axis V (FIG. 7). This can be accomplished by the asymmetric triangular shape discussed above, but four or more sided figures will also work. In particular, an arbor or arbor sleeve with blade mounting member having a trapezium shape could work (FIG. 8). Such shapes also need not necessarily have straight sides, as the mounting above does not. A three sided arbor or arbor sleeve 10 is preferred, however, because it reduces machining costs. Further, the fewer number of sides makes it easier for the user to mount the blade 21 on the sleeve 10, as there are fewer blade 21 and sleeve 10 positions which must be either visually or manually eliminated in order to find the correct alignment.

As will be apparent to one skilled in the art, the shape of the blade mounting member 24 may be machined directly on the end of the drive shaft 16 itself (not shown), instead of being formed on a sleeve 10 which is then secured to the shaft 16.

Further, while the mounting has been described here in use with a concrete cutting saw 12 and corresponding concrete cutting blade 21, it is contemplated that the mounting have uses in conjunction with various other cutting methods and devices.

There is thus provided a means and method for preventing a cutting blade from being mismounted on a saw. There is provided an arbor or arbor sleeve 10 on the drive shaft 16 of a saw 12. The blade mounting member 24 of the arbor sleeve 10 has a mounting surface 24 shaped so that when viewed directly and in a mirror, the shapes cannot coincide. The mounting hole 52 in the cutting blade's 21 first side 48 has a shape which corresponds tot hat of the mounting member 24. The cutting blade 21 is pressed onto the mounting member 24 of the sleeve 10 with the first side 48 facing away from the saw 12, as is the only orientation in which the blade 21 will fit onto the sleeve 10. The washer 54 is then placed on the shaft 16 against the first side 48 of the blade 21, and the nut 56 is threaded onto the smaller portion of the shaft 20 to secure the blade 21 to the sleeve 10 between the washer 54 and the flange 30.

Alternatively, the blade 21 may be secured by inserting the threaded bolt 58 into the hole 59 in the shaft 16 in order to press the blade 21 between the washer 54 and the flange 30, as was discussed above.

It will be understood that the above described arrangements of apparatus and the methods therefrom are merely illustrative of applications of the principles of this invention and many other embodiments and modifications may be made without departing from the spirit and scope of the invention as defined in the claims.

What is claimed is:

1. A method of orientating a rotating concrete cutting blade having a first and second side so that the blade is always mounted in a predetermined orientation on a drive shaft having a longitudinal axis about which the blade rotates, comprising:

providing a blade mounting surface connected to the shaft so that it rotates with the shaft, the blade mounting surface being non-symmetrical when rotated 180 degrees about an axis orthogonal to the longitudinal axis of the shaft;

providing a mounting hole in said blade by forming the mounting hole to have a generally triangular shape with three sides of unequal length and generally rounded corners joining the sides;

placing said blade so that the hole in the blade coincides with the blade mounting surface; and securing the blade to rotate with the shaft.

2. The method of claim 1, in which the securing step comprises placing a washer against said first side of said blade and then securing a nut onto said shaft against said washer to clamp the blade between said washer and said drive shaft.

3. The method of claim 1, in which the securing step comprises placing a washer against said first side of said blade and then securing a blot into said shaft against said washer to clamp the blade between said washer and said drive shaft.

4. The method of claim 1, in which the step of providing a mounting hole in said blade comprises providing said hole with at least three rounded corners, defining the first corner by a first arc subtended between about 20° and 160° from a point lying on the plane of the blade about 12 mm from said axis, said first arc having a radius of about 3 to 4 mm, defining the second corner by a second arc subtended between about 20° and 160° from a point lying on the plane of the blade about 11 mm from said axis and about 126° clockwise from said first point, said second arc having a radius of about 4 mm, and defining the third corner by a third arc subtended between about 20° and 160° from a point lying on the plane of the blade about 11 mm from said axis and about 119° clockwise from said second point, said third arc having a radius of about 3 to 4 mm.

5. The method of claim 1, in which the step of providing a mounting hole in said blade comprises providing said hole with at least three rounded corners, defining the first corner by a first arc subtended between about 20° and 160° from a point lying on the plane of the blade a distance from said axis, said first arc having a radius of r, defining the second corner by a second arc subtended between about 20° and 160° from a point lying on the plane of the blade a distance of about 0.9 d from said axis and about 126° clockwise from said first point, said second arc having a radius of about 1.2 r, and defining the third corner by a third arc subtended between about 20° and 160° from a point lying on the plane of the blade a distance of about 0.9 d from said axis and about 119° clockwise from said second point, said third arc having a radius of about 1.1 r.

6. The method of claim 1, in which the step of providing a mounting hole in said blade comprises providing three sides of said generally triangular hole such that the first and second sides of the hole intersect at an angle of about 56°, said second and third sides intersect at an angle of about 59°, said third and first sides intersect at an angle of about 65°, with said third side being arcuate.

7. A method of mounting a rotating concrete cutting blade having a first and second side onto a drive shaft of a concrete saw having a longitudinal axis about which the blade rotates, comprising:

providing a blade mounting surface connected to the shaft so that it rotates with the shaft, wherein the mounting surface is provided with a generally triangular shape with three sides of unequal length and generally rounded corners joining the sides;

providing said concrete cutting blade with a mounting hole sized to fit on said mounting surface; and securing the blade to rotate with the shaft.

8. The method of claim 7, in which the step of providing a mounting surface comprises providing at least three rounded corners on the surface, providing the first corner with a first arc subtended between about 20° and 160° from a point lying on the plane of the blade about 12 mm from said axis, said first arc having a radius of about 3 to 4 mm, providing the second corner with a second arc subtended between about 20° and 160° from a point lying on the plane of the blade about 11 mm from said axis and about 126° clockwise from said first point, said second arc having a radius of about 4 mm, and providing the third corner by a third arc subtended between about 20° and 160° from a point lying on the plane of the blade about 11 mm from said axis and about 119° clockwise from said second point, said third arc having a radius of about 3 to 4 mm.

9. The method of claim 7, in which the step of providing a mounting surface comprises providing three rounded corners on the surface, defining the first corner by a first arc subtended between about 20° and 160° from a point lying on the plane of the blade a distance from said axis, providing said first arc with a radius of r, defining the second corner by a second arc subtended between about 20° and 160° from a point lying on the plane of the blade a distance of about 0.9 d from said axis and about 126° clockwise from said first point, providing said second arc with a radius of about 1.2 r, and defining the third corner by a third arc subtended between about 20° and 160° from a point lying on the plane of the blade a distance of about 0.9 d from said axis and about 119° clockwise from said second point, and providing said third arc with a radius of about 1.1 r.

10. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a generally triangular shaped mounting hole in said blade to have three sides that join at three corners, the corners and sides each having a radius of curvature, forming the corners and sides so that none of the sides have a radius of curvature that is the same as the radius of curvature of any corner, forming said three sides of unequal length, and forming at least one of said three sides to be substantially straight for its full length.

11. The method of claim 10, wherein the forming steps further comprise the steps of forming said hole with at least three rounded corners, forming the first corner to define a first arc subtended between about 20° and 160° from a point lying on the plane of the blade a distance from said axis, forming said first arc with a radius of r, forming the second corner to define a second arc subtended between about 20° and 160° from a point lying on the plane of the blade a distance of about 0.9 d from said axis and about 126° clockwise from said first point, forming said second arc with a radius of about 1.2 r, forming the third corner to define a third arc subtended between about 20° and 160° from a point lying on the plane of the blade a distance of about 0.9 d from said axis and about 119° clockwise from said second point, and forming said third arc with a radius of about 1.1 r.

12. A method as defined in claim 10, wherein the forming steps further comprise the steps of forming at least three rounded corners, forming the first corner to define a first arc subtended between about 20° and 160° from a point lying on the plane of the blade about 12 mm from said axis, forming said first arc with a radius of about 3 to 4 mm, forming the second corner to define a second arc subtended between about 20° and 160° from a point lying on the plane of the blade about 11 mm from said axis and about 126° clockwise from said first point, forming said second arc with a radius of about 4 mm, and forming the third corner to define a third arc subtended between about 20° and 160° from a point lying on the plane of the blade about 11 mm from said axis and about 119° clockwise from said second point, and forming said third arc with a radius of about 3 to 4 mm.

13. A method as defined in claim 10, wherein the forming steps further comprise the steps of forming the first and second sides to intersect at an angle of about 56°, forming said second and third sides to intersect at an angle of about 59°, forming said third and first sides to intersect at an angle of about 65°, and forming said third side to be arcuate.

14. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a generally triangular shaped mounting hole in said blade to have three sides joined at three corners, forming said three sides of unequal length so that the corners joining said sides are unequal distances apart, forming the corners so that the sides join the corners at a tangent and so that the length of each corner is shorter than the length of any of the three sides as measured from those tangential joinders along the periphery of the mounting hole, and forming at least one of said three sides to extend in a substantially straight line between two of said corners.

15. A method of manufacturing a rotating concrete cutting blade so that the blade can be mounted in a predetermined orientation on a drive shaft having a longitudinal axis which substantially coincides with the rotational axis of the cutting blade, comprising the steps of forming a hole with at least three corners to encompass said rotational axis of said concrete cutting blade, forming the first corner to define a first arc subtended between about 20° and 160° from a point lying on the plane of the blade a distance from said axis, forming said first arc with a radius of r, forming the second corner to define a second arc subtended between about 20° and 160° from a point lying on the plane of the blade a distance of about 0.9 d from said axis and about 126° clockwise from said first point, forming said second arc with a radius of about 1.2 r, forming the third corner to define a third arc subtended between about 20° and 160° from a point lying on the plane of the blade a distance of about 0.9 d from said axis and about 119° clockwise from said second point, and forming said third arc with a radius of about 1.1 r.

16. A method of manufacturing a rotating concrete cutting blade with a hole that allows blade to be mounted in a predetermined orientation on a drive shaft having a longitudinal axis which substantially coincides with the rotational axis of the cutting blade, comprising the steps of forming a hole in said concrete cutting blade so the hole has the shape of a scalene triangle, forming rounded corners on said triangular hole, and forming at least one side of said triangular hole to be arcuate.

17. A method of manufacturing as defined in claim 10, comprising the further step of forming at least two of said three sides to be substantially straight.

18. A method of manufacturing as defined in claim 10, comprising the further step of forming one of said three sides to be arcuate with a constant curvature from corner to corner.

19. A method of manufacturing as defined in claim 14, comprising the further step of forming at least two of said three sides to be substantially straight.

20. A method of manufacturing as defined in claim 19, comprising the further step of forming said corners to be rounded.

21. A method of manufacturing as defined in claim 14, comprising the further step of forming one of said three sides to be arcuate with a constant curvature between corners.

22. A method of manufacturing as defined in claim 14, comprising the further step of forming two of said three sides to be substantially straight and forming the third side to be arcuate.

23. A method of orientating a rotating concrete cutting blade having a first and second side so that the blade is always mounted in a predetermined orientation on a drive shaft having a longitudinal axis about which the blade rotates, comprising:

providing a blade mounting surface connected to the shaft so that it rotates with the shaft, the blade mounting surface being non-symmetrical when rotated 180 degrees about an axis orthogonal to the longitudinal axis of the shaft;

providing a mounting hole in said blade, the mounting hole being adapted to drivingly engage the drive shaft with a generally triangular shaped surface having three sides of unequal length and with corners joining the sides, the sides and corners having each having a radius of curvature wherein none of the sides have a radius of curvature that is the same as a radius of curvature of any corner, at least one of said sides being substantially straight for that portion that drivingly connects to the drive shaft;

placing said blade so that the hole in the blade coincides with the blade mounting surface; and securing the blade to rotate with the shaft.

24. A method of manufacturing as defined in claim 23, comprising the further step of forming one of said sides to be arcuate.

25. A method as defined in claim 10, wherein the step of forming the sides further comprises the step of forming the sides to tangentially connect with the corners.

26. A method as defined in claim 14, wherein the step of forming the sides further comprises the step of forming the sides to tangentially connect with the corners.

27. A method as defined in clam 23, wherein the step of providing a mounting hole further comprises the step of providing a mounting hole having sides that tangentially connect with the corners.

28. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a mounting hole in said blade to have three sides that join at three corners, forming said three sides of unequal length, forming at least one of said three sides to be substantially straight for its full length, forming said hole with at least three rounded corners, forming the first corner to define a first arc subtended between about 20° and 160° from a point lying on the plane of the blade a distance from said axis, forming said first arc with a radius of r, forming the second corner to define a second are subtended between about 20° and 160° from a point lying on the plane of the blade a distance of about 0.9 d from said axis and about 126° clockwise from said first point, forming said second arc with a radius of about 1.2 r, forming the third corner to define a third arc subtended between about 20° and 160° from a point lying on the plane of the blade a distance of about 0.9 d from said axis and about 119° clockwise from said second point, and forming said third arc with a radius of about 1.1 r.

29. A method as defined in claim 28, wherein the forming steps further comprise forming the first corner to define a first arc subtended between about 20° and 160° from a point lying on the plane of the blade about 12 mm from said axis, forming said first arc with a radius of about 3 to 4 mm, forming the second corner to define a second arc subtended between about 20° and 160° from a point lying on the plane of the blade about 11 mm from said axis and about 126° clockwise from said first point, forming said second arc with a radius of about 4 mm, and forming the third corner to define a third arc subtended between about 20° and 160° from a point lying on the plane of the blade about 11 mm from said axis and about 119° clockwise from said second point, and forming said third arc with a radius of about 3 to 4 mm.

30. A method as defined in claim 28, wherein the forming steps further comprise the steps of forming the first and second sides to intersect at an angle of about 56°, forming said second and third sides to intersect at an angle of about 59°, forming said third and first sides to intersect at an angle of about 65°, and forming said third side to be arcuate.

31. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a mounting hole in said blade to have three sides joined at three corners, forming said three sides so that the corners joining said sides are unequal distances apart, forming at least one of said three sides to extend in a substantially straight line between two of said corners, forming at least two of said three sides to be substantially straight, and forming said corners to be rounded.

32. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a triangular shaped mounting hole in said blade to have three sides that join at three corners, forming said three sides of unequal length and so that none of the sides comprise a plurality of lines that intersect at an angle, and forming the corners so that the intersection between each side and it's respective corners is a point when one side meets the other side, or is tangent to the corner.

33. A method of manufacturing a rotating concrete curing blade with a hole allowing the blade to be mounted in a predetermined orientation on a drive shaft having a longitudinal axis which substantially coincides with the rotational axis of the cutting blade, comprising the steps of forming an non-symmetrically shaped mounting hole in said blade, the hole having a plurality of substantially straight sides joined at not more than four corners.

34. A method as defined in claim 33, wherein the shape of the hole is a trapezium.

35. A method as defined in claim 33, wherein the shape of the hole is a scalene triangle.

36. A method of orientating a rotating cutting blade having a first and second side so that the blade is always mounted in a predetermined orientation on a drive shaft having a longitudinal axis about which the blade rotates, comprising:

providing a blade mounting surface connected to the shaft so that it rotates with the shaft, the blade mounting surface being provided with a triangular shape with two substantially straight sides and one convex side, the sides joined by rounded corners so that the mounting surface is non-symmetrical when rotated 180 degrees about an axis orthogonal to the longitudinal axis of the shaft;

providing a mounting hole in said blade, the mounting hole being adapted to drivingly engage the triangular blade mounting surface; and securing the blade to rotate with the mounting surface.

37. A method as defined in claim 36, wherein the blade mounting surface is formed on the surface of the drive shaft.

38. A method of manufacturing a rotating concrete cutting blade with a hole allowing the blade to be mounted in a predetermined orientation on a drive shaft having a longitudinal axis which substantially coincides with the rotational axis of the cutting blade, comprising the steps of forming a non-symmetrically shaped triangular mounting hole in said blade, the hole being formed with three sides two of which are substantially straight and one of which is convex, and joining the sides with generally rounded corners.

39. A method of manufacturing a rotating concrete cutting blade that rotates about an axis through the center of the cutting blade, comprising the steps of:

forming a triangular shaped hole about the rotational axis of the concrete cutting blade, forming the hole with two substantially straight sides and one convex side, joining the sides by generally rounded corners spaced unequal distances apart so that the mounting hole is non-symmetrical when rotated 180 degrees about an axis orthogonal to the rotational axis.

* * * * *

UNITED STATES PATENT AND TRADEMARK OFFICE
CERTIFICATE OF CORRECTION

PATENT NO. : 5,660,161
DATED : August 26, 1997
INVENTOR(S) : Edward R. Chiuminatta et al.

It is certified that error appears in the above-identified patent and that said Letters Patent is hereby corrected as shown below:

In Column 1, Line 35, change "to-enter" to read --to enter--;

In Column 3, Line 53, change "oft he blade" to read --of the blade--;

In Column 5, Line 38, change "about 39 inches" to read --about .39 inches--;

In Column 6, Line 41, change "inches.(27.8 mm)." to read --inches (27.8 mm).--;

In Column 8, Line 46, change "tot hat of" to read --to that of--;

In Column 9, Line 22, change "a blot into" to read --a bolt into--;

In Column 13, Line 1, change "third are" to read --third arc--;

In Column 13, Line 13, change "second are" to read --second arc--;

In Column 13, Line 15, change "third are" to read --third arc--;

UNITED STATES PATENT AND TRADEMARK OFFICE
CERTIFICATE OF CORRECTION

PATENT NO. : 5,660,161

DATED : August 26, 1997

INVENTOR(S) : Edward R. Chiuminatta et al.

It is certified that error appears in the above-identified patent and that said Letters Patent is hereby corrected as shown below:

In Column 13, Line 18, change "third are" to read --third arc--; and

In Column 13, Line 50, change "curing blade" to read --cutting blade--.

In column 13, line 7, change "first are" to read --first arc--

Signed and Sealed this

Seventh Day of April, 1998

BRUCE LEHMAN

Attest:

*Attesting Officer*    *Commissioner of Patents and Trademarks*